Oct. 10, 1967  J. M. LAPEYRE  3,345,682
PROCESS FOR INDIVIDUALLY TREATING HEADLESS SHRIMP
Original Filed May 25, 1965  3 Sheets-Sheet 2

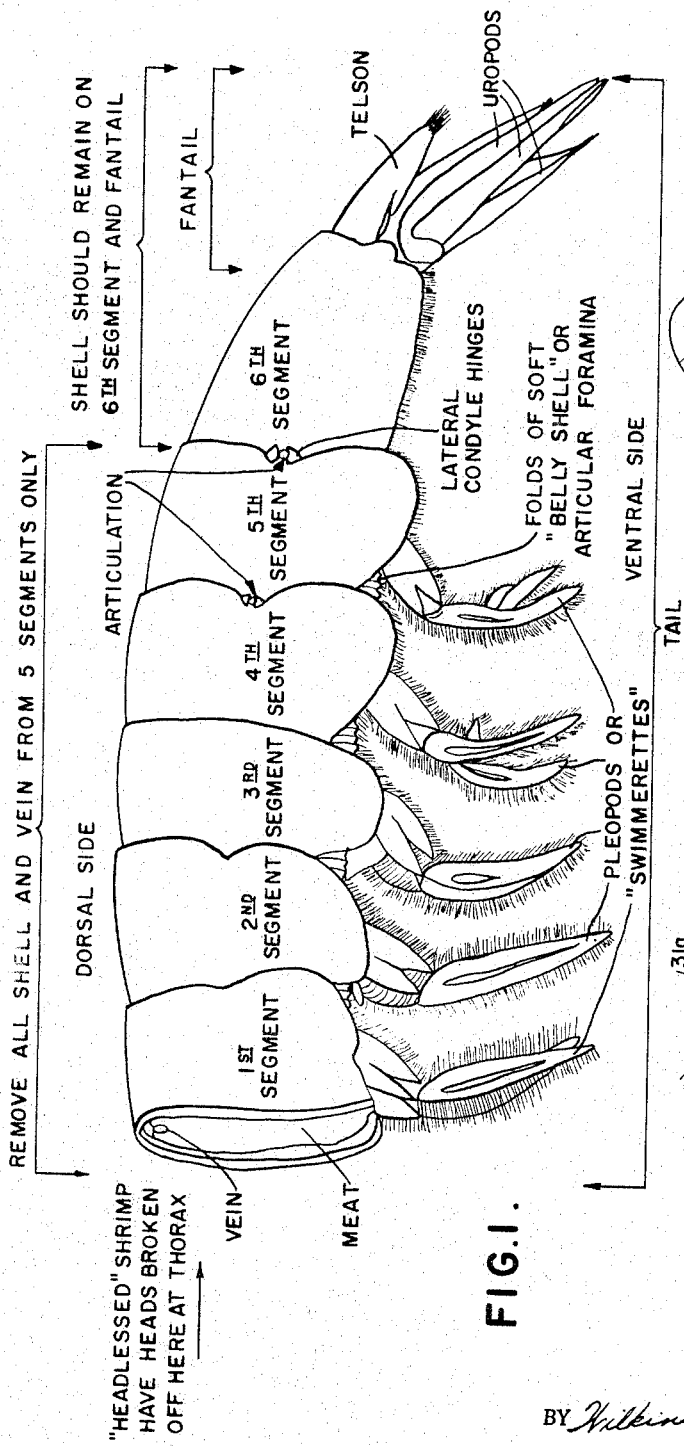
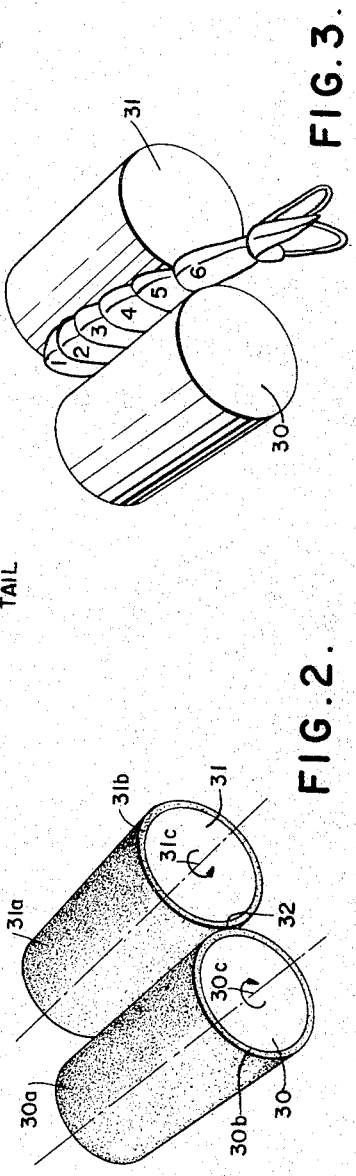

INVENTOR
James M. Lapeyre

BY
ATTORNEYS

Oct. 10, 1967 J. M. LAPEYRE 3,345,682
PROCESS FOR INDIVIDUALLY TREATING HEADLESS SHRIMP
Original Filed May 25, 1965 3 Sheets-Sheet 3

*INVENTOR*
James M. Lapeyre

BY *Wilkinson, Mawhinney-Theibault*

ATTORNEYS

United States Patent Office 3,345,682
Patented Oct. 10, 1967

3,345,682
PROCESS FOR INDIVIDUALLY TREATING HEADLESS SHRIMP
James M. Lapeyre, New Orleans, La., assignor to The Laitram Corporation, New Orleans, La., a corporation of Louisiana
Original application May 25, 1965, Ser. No. 458,645. Divided and this application Dec. 30, 1966, Ser. No. 619,105
16 Claims. (Cl. 17—45)

The application is a division of my copending application, Ser. No. 458,645, filed May 25, 1965.

The present invention relates to process for indiviually treating headless shrimp.

Fantail or butterfly shrimp is a commercial form in which the first five abdominal segments of the shell of a headless shrimp are removed to expose the meat while the 6th abdominal segment is unaffected and remains in place in its original, natural condition along with the uropods and telson which together form the tail section having a generally fan formation.

The invention has for an object certain novel steps of the process by which shrimp of this type are economically and quickly produced in a clean-cut operation in which the integrity of the meat is preserved.

Another object of the invention is to provide a novel process for producing so-called fantail or butterfly shrimp in which meat exposed by the de-shelled segments is spread to a flattened condition more suitable for breading, handling and consumption.

A further object of the invention is to provide a novel process by which fantail or butterfly shrimp may be produced in a single-placement operation whereby previously de-headed shrimp are immobilized to an initially de-activated peeling machine which serves as a cradle for the shrimp, in which any or all steps of the process may be performed such as breaking or disjointing the lateral condyle hinges between the 5th and 6th abdominal segments to facilitate the later peeling of the 5th segment independently of the 6th such abdominal segment, and in which placement an incising or slitting operation may be performed on the dorsal side of the shrimp to and through the first five abdominal segments, omitting the 6th segment and leaving the latter substantially intact, and in which placement the severed half or partial sections of the incised segment may be finally peeled or pulled from the body by activation of the peeling machine.

Other objects are to simplify the mechanical detail and the steps of the process and to promote economy in the production of fantail or butterfly.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a schematic of a de-headed shrimp with applicable terminology applied thereto showing the raw product on which the improved process and apparatus operate.

FIGURE 2 is a fragmentary perspective view showing a form of a piece of apparatus on which at least one step of the improved process is carried out.

FIGURE 3 is a similar view showing a headless shrimp cradled in the crotch of the rollers which are indicated as slightly modified over the rollers of FIGURE 2.

Figure 4:
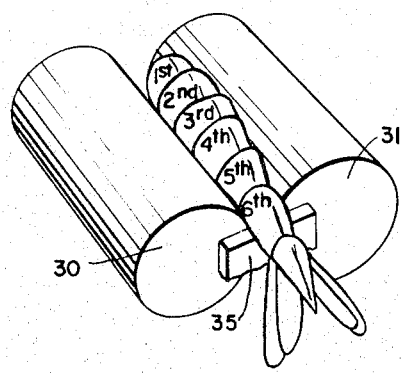
FIGURE 4 is a fragmentary perspective view showing the introduction of an anvil on which the 6th abdominal segment of the shrimp is made to rest incident to a subsequent step of the process.

Referring more particularly to the drawings and initially to FIGURE 1 which illustrates the essential morphology of the shrimp, particularly the white shrimp (*Penacus setiferus*) which is more particularly illustrated on pages 4, 5, 6 and 104 of Fishery Bulletin 145, by Joseph H. Young, from Fishery Bulletin of the Fish and Wildlife Service, volume 59, United States Department of the Interior.

FIGURE 1 illustrates a headless or de-headed shrimp showing that the body section containing the edible meat is enclosed in abdominal segments numbered 1 to 6 inclusive, the 6th segment being directly connected to the uropods and the telson: such 6th segment being connected with the 5th segment by the lateral condyle hinges which provide the articulation between these segments by which the shrimp is enabled to assume the curled condition typical of the specie.

A detail of this articulation is shown more clearly on page 104 of the publication referred to. While there is a similar articulation between the 4th and 5th segments it does not possess the strength of the hinges between the 5th and 6th segments and as the 5th segment along with segments 1, 2, 3 and 4, is to be incised and removed revealing the body meat, the invention is not concerned with the articulation between the 4th and 5th segments but only with the hinges between the 5th and 6th segments, as the latter are preferably to be disjointed, pulled out or broken advantageously before slitting the dorsal side of the shrimp as otherwise an undisturbed articulation at this point may become troublesome in securing full and clean removal of the 5th segment and may cause tearing of the meat or other multilation resulting in downgrading of the meat in the market.

This FIGURE 1 also shows the position of the sand vein which must be removed to avoid its adverse deteriorating effect on the meat.

FIGURE 1 also shows some of the appendages which project from the ventral side of the shrimp. These appendages are useful in the de-shelling operation, particularly where roller peeling is employed. It is to be noted that the 6th segment contains very little, if any, appendages so that even if it is subjected to the crotch of peeling rollers there is reduced tendency to draw the uncut shell into the nip of the rollers.

As indicated also in FIGURE 1, it is a purpose of the invention to remove the shell of the first five segments along with the appendages and with the sand vein, and for this purpose the dorsal sides of the first five segments are slit or incised longitudinally, preferably in alignment with the tunnel in the meat containing the sand vein so that the sand vein may be removed possibly even in one operation with the incision or slitting step, which latter is generally omitted from the 6th segment, leaving the shell of this segment all around substantially unaffected and intact.

FIGURE 2 shows frictional peeling members in their simplest form, namely, rollers 30 and 31 rotatable about axes 30c and 31c. The rollers are spaced apart slightly so that the shells which are removed from abdominal segments 1, 2, 3, 4 and 5 of the shrimp are able to pass through the gap or nip 32 between the rollers to the underside of the same, where they may may be washed away by water or other fluid.

If the rollers 30 and 31 are provided with deformable, for instance, rubber, coverings 30b and 31b it will not be necessary to space them apart since the rubber covers will deform sufficiently to allow passage of the shells.

The rollers, so associated, present convex or arcuate confronting surfaces 30a and 31a outwardly or upwardly of the nip 32 and together with the nip these surfaces form a cradle for receiving and supporting the shrimp providing a single-emplacement for the shrimp throughout all steps of the process.

FIGURE 3 shows the shell-on shrimp nested in the cradle between the confronting curvilinear surfaces 30a and 31a of the rollers with its ventral side facing the nip 32 between said rollers. The placement of the shrimp is such that abdominal segment 6 is at least partially overhanging the ends of the rollers and the uropods and telson are wholly outside the cradle and forwardly of the ends of the rollers.

FIGURE 4 also shows the shell-on shrimp in place in the cradle with the ventral side facing the nip between the rollers 30 and 31 and abdominal segment 6 overhanging and supported by an anvil or tail support 35. The purpose of the anvil or tail support is two-fold: in the first place to prevent abdominal segment 6 from being drawn into the nip between the rollers which would result in mutilation or complete breaking off of the shrimp tail, and in the second place the part 35 provides a fulcrum over which the tail section, which is comprised of abdominal segment 6 with connecting telson and uropods, may be forcibly bent in order to effect breaking of the lateral condyle hinges which provide the articulation between abdominal segments 5 and 6.

Figure 5:
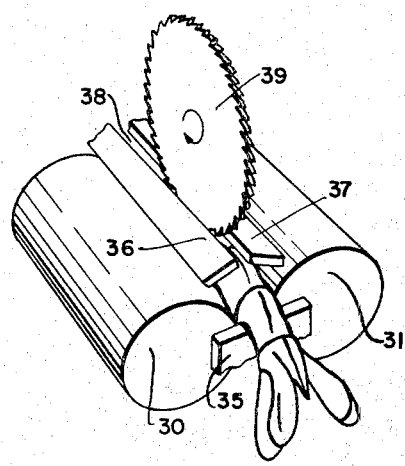
FIGURE 5 is a further fragmentary perspective view illustrating the application of a slotted retaining member to the shrimp occupying the crotch with a rotary saw in the act of incising the dorsal side of the shrimp.

In FIGURE 5 the shell-on shrimp still reposes in the cradle between the rollers 30 and 31 with the ventral side facing the nip between the rollers. The same is forcibly held in this position or in other words immobilized by the retaining members or bars 36, 37 which are spaced apart to provide a blade passage or slot 38 for the blade or slitting tool which in this figure is shown to be a rotary saw 39 positioned to traverse the upper dorsal side of the shrimp in a longitudinal direction.

This incising or ripping tool may be moved along the slot 38 the distance of abdominal shell segments 1 to 5 inclusive. The tool will cut through these shell segments in longitudinal alignment with the tunnel in the meat occupied by the black vein and in a certain percentage of cases will rip out the black vein and also penetrate a suitable distance into the meat below the vein to facilitate spreading and flattening of the meat in cases where this is desired.

Figure 6:
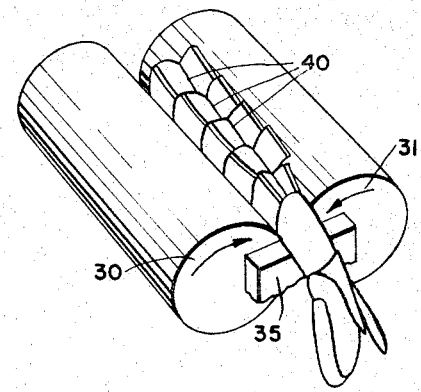
FIGURE 6 is a fragmentary perspective view illustrating the rollers or curvilinear surfaces as put in motion and the de-shelling step begun or in progress.

FIGURE 6 shows the condition of the shrimp after the tool 39 and the retaining members 36, 37 have been removed and the rollers 30 and 31 put into rotary movement. The frictional surfaces of the sand-blasted metal or other rollers are engaging the lateral portions or halves of the incised segments 1 to 5 and shifting the same toward the nip 32 through which the shell sections are pulled from the meat. The slippery nature of the meat and the pinching or squeezing action of the rollers tends to reject the meat upwardly and in the event that the incision has penetrated from the tunnel into the meat, as indicated at 40 in FIGURE 6, the meat will have a tendency to spread out in the progressively widening area outwardly of the nip 32 by reason of the arcuate or curvilinear surfaces 30a and 31a.

Figure 7:
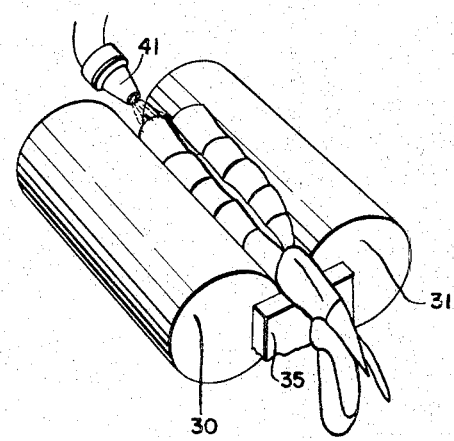
FIGURE 7 is a fragmentary perspective view showing the de-shelling operation as substantially completed with the application of pressure fluid for removing the shrimp from the cradle after the completion of all operations.

FIGURE 7 shows a further step of the process in which all of the shell segments 1, 2, 3, 4 and 5 have been removed from the meat and a water or other jet is directed into the cradle space at the rear end thereof by which the completely treated shrimp is forced or ejected from its position between the rollers in a forward direction.

Figure 8:
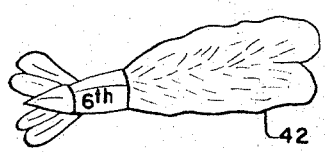
FIGURE 8 is a perspective view on a reduced scale of the fantail or butterfly shrimp product by the improved process and machine in which the 6th abdominal shell segment, the uropods and telson remain unaffected and intact and the body meat attached thereto and in a substantially flattened condition ready for frying, breading or other cooking procedures.

FIGURE 8 illustrates the end product, being a completed fantail shrimp 42 where all shell has been removed except for abdominal segment 6 with the connecting telson and uropods.

Figure 9:
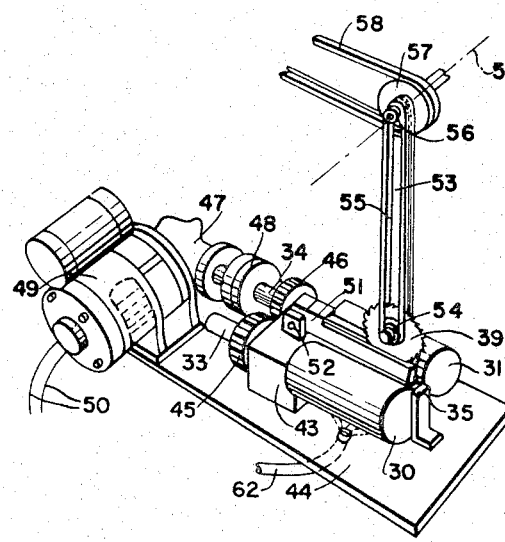
FIGURE 9 is a perspective view of a form of machine for driving the rollers or curvilinear surfaces and for operating the circular incising or slitting saw.

Referring more particularly to FIGURE 9, the rollers 30 and 31 being short, do not require any support at their forward ends but the shafts 33 and 34 thereof are or may be journaled in bearings in a mounting block 43 installed on a suitable base or bed 44. The shafts 33 and 34 may be geared together by intermeshing pinions 45 and 46 to insure rotation of the rollers in relatively opposite directions.

The shafts may be driven in any suitable manner by suitable power source. For instance, one of the shafts 34 is shown in FIGURE 9 as coupled to the output shaft of a motorized speed reducer 47 by a coupling 48, the reducer being driven by an electric or other motor 49 connected to an appropriate power and control source through wires 50. The pinion 46 transmits rotary motion, although in an opposite sense, to pinion 45 causing the rollers to rotate in relatively opposite directions as heretofore explained.

Figure 11:
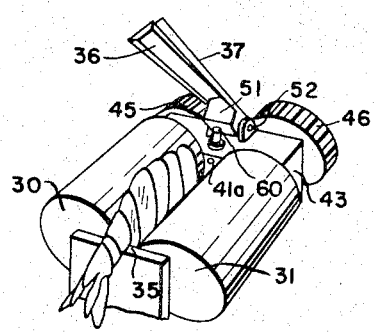
FIGURE 11 is also a fragmentary perspective view showing the retaining member in the raised position to permit the placement of a shrimp in the roller cradle with the 6th abdominal section draped over the end.

The shrimp immobilizing and retaining bars 36 and 37 may be connected together by a yoke 51 pivoted at 52 to an upstanding member on the block 43 in an orientation in which the immobilizing or retaining member may hinge or pivot about a substantially horizontal transverse axis so as to permit the immobilizing and retaining member to swing upwardly to the position of FIGURE 11 to permit the placement of shrimp in the cradle.

The blade or saw 39 is mounted for rotation on an arm 53 and may be driven through a pulley 54 from a belt 55, which in turn is driven by a pulley 56 receiving rotation from an associated pulley 57 which is driven from belt 58 from an appropriate power source. The arm 53 swings about an axis 59 so that the blade or saw 39 may be forced to traverse the length of the slot 38 between the retaining members 36 and 37. The anvil is indicated at 35.

Figure 10:
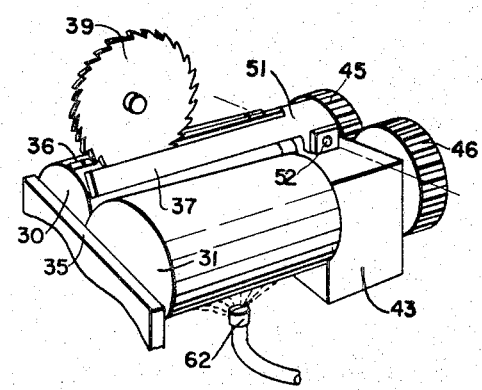
FIGURE 10 is a fragmentary perspective view showing more clearly the entry of the circular rotary saw through a slot in the retaining member.

FIGURE 10 is an enlarged perspective view showing the rollers 30 and 31, the mounting block 43, the pinions 45 and 46 and the pivotal connection 52 for the retaining bars 36 and 37 which are yoked together at 51.

FIGURE 11 is also an enlarged perspective view showing the shrimp nested between the rollers 30 and 31 with the ventral side facing downwardly. In this instance the shrimp retaining members or bars 36 and 37 are shown in raised position about the pivotal axis 52. A reciprocating push rod 60 is shown as extending up through the mounting block 43 to engage the underside of the yoke 51 in a lifting action as hereinafter explained.

A jet orifice 41a in connection with a source of liquid under appropriate pressure may be mounted through the block 43 aimed at the shrimp so as to eject the shrimp from the cradle on completion of all process steps.

Figure 12:
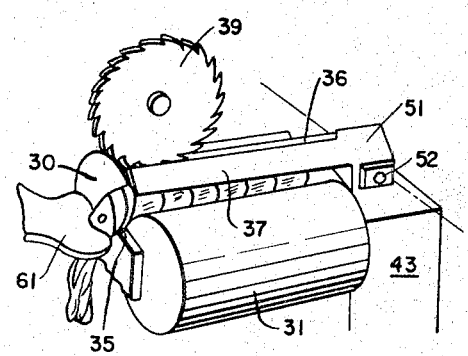
FIGURE 12 is also a fragmentary perspective view showing the subsequent lowering of the retaining member, the completion of the slitting operation by the saw and the breaking of the lateral condyle hinges between the 5th and 6th abdominal segments of the shrimp.

Referring more particularly to FIGURE 12, a thrust member 61, manually or mechanically actuated, is positioned to apply bending force to the tail section so as to break the lateral condyle hinge joint between abdominal segments 5 and 6. The retaining members 36, 37 will hold the shrimp down against any tendency of the shrimp to rise or lift incident to the application of force through the member 61 to achieve this breaking of the hinges. The first five abdominal segments will be held against any movement by the bars or members 36, 37 throughout the joint breaking operation. The 6th abdominal segment, however, will be free to rock about the fulcrum 35, thus enabling the tail portion to be bent down, in which position it is removed from the plane of cut so that the blade or saw 39 rotating about its axis may cut the abdominal segments 1, 2, 3, 4 and 5 without cutting abdominal segment 6. The cutting of segments 1 through 5 without any cutting of segment 6 is desirable with the articulation breaking method herein employed.

Under the provisions of Patent Rule 79, this application while disclosing the subject matter of the specific form of breaking the articulation between the 5th and 6th abdominal shell segments is not claimed herein for the reason that it is not applicant's invention but the invention of one Fernand S. Lapeyre, whose independent application therefor is now pending, Ser. No. 463,290, filed June 11, 1965, both applications being owned by the common assignee, The Laitram Corporation. Consequently, as a part of the process and apparatus forming the invention herein, the step or means of breaking this articulation is only claimed broadly.

In case of a different articulation breaking method, such as that shown in the Ambos Patent No. 3,164,859, granted Jan. 12, 1965, it would be permissible to have the blade cut to some extent into abdominal segment 6 since removal of this segment is precluded by the presence of the anvil 35.

So far as roller surfaces are concerned, it is preferred to use either a rubber covered roller or a roller of stainless steel having a very finely sandblasted surface. Both such surfaces supply sufficient friction to peelingly engage the incised shrimp shell sections of the abdominal segments and move same to and through the peeling nip, while such rollers are completely harmless to the slippery shrimp meat once the shell has been removed and will not grip the shrimp meat in any manner to injure the same.

In FIGURES 9 and 10, a water line and nozzle 62 are shown for cleaning the rollers.

Although I have disclosed herein the best forms of the invention known to me at this time, I reserve the right to all such modifications and changes as may come within the scope of the following claims.

What is claimed is:

1. The process of treating de-headed and dorsally cut shrimp for the so-called fantail market, comprising
   (a) positioning abdominal segments 1, 2, 3, 4 and 5 of the shrimp between peeling surfaces convergent to a peeling nip, so that the long axis of the shrimp lies substantially in a plane with the peeling nip, and so that the lateral sides of the said abdominal segments of the shrimp are in contact with the peeling surfaces,
   (b) positioning abdominal segment 6 with connecting telson and uropods so that said segment 6 and connecting telson and uropods will remain substantially free of effective frictional peeling contact with the convergent peeling surfaces, and
   (c) causing the peeling surfaces and the peeling nip to act upon the dorsally cut shell segments 1, 2, 3, 4 and 5 so that said shell segments are removed from the shrimp meat, leaving abdominal shell segment 6 with its connecting uropods and telson substantially intact and attached to the de-shelled shrimp meat.

2. The process of treating de-headed shrimp for the commercial fantail market, comprising
   (a) positioning the ventral side of abdominal segments 1, 2, 3, 4 and 5 of the shrimp between curvilinear peeling surfaces convergent to a peeling nip, so that the long axis of the shrimp lies substantially in a plane with the peeling nip, and so that at least portions of the lateral sides of the said abdominal segments are in contact with the convergent peeling surfaces,
   (b) substantially immobilizing abdominal segments 1, 2, 3, 4 and 5 of the shrimp in this position relative to the peeling surfaces,
   (c) breaking the lateral condyle hinges of the shell segments between segments 5 and 6,
   (d) longitudinally cutting through the dorsal side of at least the shell segments 1, 2, 3, 4 and 5, and
   (e) thereafter causing the peeling surfaces and the peeling nip to act upon the dorsally cut shell segments 1, 2, 3, 4 and 5 so that the said shell segments are separated from the shrimp meat, leaving abdominal shell segment 6 with its connecting uropods and telson substantially intact and attached to the de-shelled shrimp meat.

3. The process of treating de-headed shrimp, which comprises
   (a) positioning the ventral side of abdominal segments 1, 2, 3, 4 and 5 between movable support surfaces convergent to a peeling nip so that portions of the lateral sides of said abdominal segments are in contact with said surfaces,
   (b) while so positioned, cutting the dorsal side longitudinally at least through the shell segments 1, 2, 3, 4 and 5, and
   (c) thereafter causing esaid movable support surfaces and the peeling nip to frictionally engage the dorsally cut shell segments so that said shell segments are separated from the shrimp meat by passage through the peeling nip.

4. The process of treating de-headed shrimp for the so-called fantail commercial market, comprising
   (a) positioning abdominal segments 1, 2, 3, 4 and 5 of the shrimp in contact with rollers, having surfaces which converge to a peeling nip, so that the ventral sides of the said abdominal segments are positioned between the converging surfaces of the rollers, and so that portions of the lateral sides of the said abdominal segments are in contact with the converging surfaces of the rollers,
   (b) positioning abdominal segment 6 with the connecting telson and uropods substantially free of the converging roller surfaces,
   (c) substantially immobilizing abdominal segments 1, 2, 3, 4 and 5 of the shrimp in the aforesaid position relative to the aforesaid rollers,
   (d) breaking the lateral condyle hinge joints between abdominal shell segments 5 and 6,
   (e) longitudinally cutting the dorsal side of at least the shell segments 1, 2, 3, 4 and 5, and
   (f) thereafter causing the convergent surfaces of the rollers and the peeling nip to act upon the dorsally cut shell segments 1, 2, 3, 4 and 5 so that the said shell segments are removed from the shrimp meat and separated therefrom, leaving abdominal shell segment 6 with its connecting telson and uropods to remain substantially intact and attached to the shrimp meat.

5. The process for treating de-headed shrimp for producing so-called fantail or butterfly shrimp for the commercial trade, comprising
   (a) placing the de-headed shrimp in a de-activated peeling machine having a peeling nip with the ventral sides of abdominal segments 1 to 5 only presented to the nip, (b) in this emplacement longitudinally slitting on the dorsal side said abdominal shell segments 1 through 5 inclusive, and (c) without changing the placement, activating the machine to peel the slit abdominal shell segments 1 through 5 only.

6. The process for treating de-headed shrimp for producing so-called fantail or butterfly shrimp for the commercial trade, comprising (a) placing the de-headed shrimp in a de-activated peeling machine having a peeling nip with the ventral sides of abdominal segments 1 to 5 only presented to the nip, (b) in this emplacement disjointing the lateral condyle hinges between abdominal segments 5 and 6, (c) in this same emplacement then longitudinally slitting on the dorsal side abdominal shell segments 1 through 5, and (d) without changing the placement, activating the machine to cause removal of the slitted shell segments to and through the nip in a direction laterally of the lengthwise dimension of the shrimp as so emplaced.

7. The process of treating de-headed shrimp for producing fantail or butterfly shrimp, which comprises (a) placing the shrimp ventral side toward a peeling nip between curvilinear surfaces which diverge outwardly from the nip for centering, guiding and sidewise supporting the shrimp, (b) in this emplacement performing a sawing operation upon the dorsal side of the shrimp to and through the first five abdominal shell segments substantially excluding the 6th such segment, and (c) subesquently putting such surfaces into rotation in relatively opposite directions toward the nip for frictionally stripping the severed shell segments 1 to 5 inclusive from the slippery meat which is rejected and left upon the surfaces outwardly of the nip.

8. The process for treating de-headed shrimp for producing so-called fantail or butterfly shrimp for the commercial trade, which comprises (a) placing the shrimp with its ventral side upon rotatable curvilinear surfaces while such surfaces are at rest relatively to one another and which surfaces extend to and through a peeling nip, with such surfaces extending from the nip in mutually confronting and opposite arcs gradually and progressively widening away from the nip, (b) immobilizing the shrimp in such position, (c) breaking the lateral condyle hinges between the 5th and 6th abdominal segments, (d) slitting through abdominal shell segments 1 to 5 inclusive, leaving the 6th abdominal segment intact, and (e) putting the surfaces into movement in relatively opposite directions so that the confronting portions of such surfaces move together toward, to and through the nip for frictionally entraining therewith the said shell lateral halves in a peeling operation, while the slippery meat exposed by the peeling operation is rejected and is ultimately recovered from the surfaces.

9. The process of treating de-headed shrimp to produce fantail or butterfly shrimp in which the 6th abdominal shell segment and the uropods and telson remain intact along with the meat recovered from the first five segments, comprising (a) cradling the de-headed shrimp between two curvilinear surfaces convergent to a peeling nip therebetween in which the ventral sides only of abdominal segments 1 through 5 only are presented to the nip, (b) immobilizing the shrimp in such position, (c) while so immobilized, incising abdominal segments 1 through 5 inclusive of the shrimp longitudinally along the dorsal side in alignment with the tunnel containing the sand vein for simultaneously ripping out such sand vein and penetrating the included meat body beyond the tunnel, and (d) putting in rotation the curvilinear surfaces in mutual movement toward and through the nip for stripping the incised shell segments from the body meat in a peeling operation in which the severed shell segments are drawn through the nip while the included slippery meat body escapes from the nip and flattens out by virtue of the incision made therein and afforded by the constantly enlarging space between the curvilinear surfaces progressively outwards of the nip.

10. The process of treating de-headed shrimp for producing fantail or butterfly shrimp in which the 6th abdominal shell segment and the uropods and telson remain intact along with the de-shelled and recovered meat body included within the first five abdominal segments, which comprises (a) locating the first five abdominal segments of the shrimp in an orientation with the dorsal side outward in a cradle formed by confronting arcs of opposed circular surfaces while such surfaces are at rest relatively to each other, (b) disjointing the lateral condyle hinges between the 5th and 6th segment while the shrimp is so located, (c) sawing longitudinally through the dorsal portions of the first five abdominal shell segments to separate the lateral portions of these shell segments, and (d) rotating said surfaces mutually to and through the nip for performing a peeling operation by drawing therewith the lateral severed portions of the shell segments and exposing the slippery meat pinched from the shell segments as the same are drawn together to and through the nip.

11. A process for treating de-headed shrimp to produce fantail or butterfly shrimp, comprising (a) presenting the ventral sides of abdominal segments 1 through 5 of a shrimp to a substantially longitudinal nip between opposed confronting convex nonrotating rotatable surfaces with the surfaces engaging lateral portions of such segments 1 to 5 of the shrimp, (b) restraining the dorsal side to avoid displacing movement of the shrimp outwardly of the nip, (c) while so restrained, slitting through the first five abdominal segments in a longitudinal direction substantially coincident with the tunnel which houses the sand vein for dividing the abdominal segments affected into substantially half sections, and (d) subsequently putting the surfaces in at least partial rotation in relatively opposite directions to cause the convex surface portions to move in relatively opposite directions mutually toward the nip for performing a peeling operation on the first five abdominal segments without affecting the 6th segment and the tail portion of the shrimp.

12. The process of treating de-headed shrimp, which comprises (a) placing the shrimp dorsal side outwardly between initially static rotatable circular surfaces convergent to a substantially longitudinal peeling nip in which the ventral side of the shrimp is exposed including the appendages thereof to said nip, (b) immobilizing the shrimp in this placement, (c) in this placement and immobilization, incising the shell of the shrimp longitudinally along the dorsal side to and through at least abdominal shell segments 1 through 5, and (d) generating rotary movement in said circular surfaces in relatively opposite directions to and through the nip for drawing the incised shell segments through the nip in a peeling operation, at the same time squeezing the included meat free of the shell segments.

13. The process of treating headless shrimp to fantail or butterfly production, comprising
   (a) placing the shrimp with its ventral side down with the first five abdominal shell segments resting on non-rotating rotatable confronting curvilinear surfaces convergent to a peeling nip and with the 6th abdominal segment disposed substantially beyond such surfaces,
   (b) immobilizing the first five abdominal segments of the shrimp in this placement,
   (c) ripping longitudinally through the outer exposed dorsal sides of such shell segments to divide same into lateral sections engaged by the curvilinear surfaces, and
   (d) thereafter generating rotation in the surfaces in relatively opposite directions in relatively inward strokes to and through the nip for affecting a peeling operation restricted to abdominal segments 1 through 5.

14. The process of treating de-headed shrimp for fantail or butterfly production as claimed in claim 13, further comprising
   (e) before ripping, disjointing the lateral condyle hinges between the 5th and 6th shell segments.

15. The process for treating de-headed shrimp for producing so-called fantail or butterfly shrimp for the commercial trade, comprising
   (a) placing the shrimp ventral side down into a cradle formed by substantially horizontally spaced initially non-rotating rotatable rollers which are convergent to a substantially upright peeling nip.
   (b) immobilizing the shrimp in such emplacement,
   (c) breaking the natural articulation between the 5th and 6th abdominal segments of the shrimp,
   (d) slitting the exposed dorsal sides of abdominal shell segments 1 to 5 inclusive in a longitudinal direction, and
   (e) putting the rollers into rotation in relatively opposite directions with the surfaces of the cradle moving downwardly toward the nip and to and through the nip for frictionally entraining therewith the severed sections of segments 1 to 5 inclusive leaving unslitted abdominal segment 6 intact with the uropods and telson and retaining its natural connection with the de-shelled meat of said segments 1 to 5 inclusive.

16. The method of treating de-headed shrimp which comprises
   (a) placing frictional abdominal shell segments 1, 2, 3, 4 and 5 of the shrimp in contact with static frictional peeling surfaces,
   (b) cutting through the dorsal side of at least shell segments 1, 2, 3, 4 and 5, and
   (c) thereafter activating the peeling surfaces to act upon the dorsally cut shell segments 1, 2, 3, 4 and 5 so as to remove them from the shrimp meat, leaving abdominal shell segment 6 with connecting telson and uropods to remain substantially intact and attached to the shrimp meat.

References Cited

UNITED STATES PATENTS

| | | | |
|---|---|---|---|
| 2,716,776 | 9/1955 | Streich et al. | 17—2 |
| 2,974,356 | 3/1961 | Cerny | 17—2 |
| 3,164,859 | 1/1965 | Ambos et al. | 17—45 |
| 3,277,517 | 10/1966 | Jonsson | 17—45 |

LUCIE H. LAUDENSLAGER, *Primary Examiner.*